United States Patent [19] [11] 4,441,148
Hirata [45] Apr. 3, 1984

[54] POWER CONVERTING DEVICE AND A PROTECTION DEVICE FOR THE SAME

[75] Inventor: Akio Hirata, Fuchuu, Japan

[73] Assignee: Tokyo Shibaura Denki Kabushiki Kaisha, Kanagawa, Japan

[21] Appl. No.: 347,168

[22] Filed: Feb. 9, 1982

[30] Foreign Application Priority Data

Feb. 26, 1981 [JP] Japan ................. 56-27421

[51] Int. Cl.³ ............................. H02H 7/125
[52] U.S. Cl. ............................ 363/54; 363/68; 361/82; 361/84
[58] Field of Search ............... 363/52–58, 363/67–72, 87, 129; 307/252 K, 252 L, 252 M, 252 N, 252 P, 252 Q, 252 T; 361/82, 84, 86–88, 91, 93

[56] References Cited

U.S. PATENT DOCUMENTS

| | | | |
|---|---|---|---|
| 4,112,286 | 9/1978 | Alderman et al. | 363/57 X |
| 4,313,156 | 1/1982 | Kobayashi et al. | 363/54 |
| 4,319,318 | 3/1982 | Rippel et al. | 363/57 X |
| 4,320,445 | 3/1982 | Kobayashi et al. | 363/54 |
| 4,325,114 | 4/1982 | Kobayashi et al. | 363/68 |

FOREIGN PATENT DOCUMENTS 48-31035 9/1973 Japan .
50-38508 12/1975 Japan .

Primary Examiner—Peter S. Wong
Attorney, Agent, or Firm—Oblon, Fisher, Spivak, McClelland & Maier

[57] ABSTRACT

A power converting device including at least one power converting element, and a protection circuit monitoring the switching characteristics of the power converting element and for protecting the power converting element during switching thereof, including a first circuit coupled to detect a reverse voltage applied to the power converting element, a second circuit coupled to the first circuit for receiving the detected reverse voltage and for integrating the detected reverse voltage to produce a reverse voltage/time integral signal, and a third circuit coupled to receive the reverse voltage/time integral signal for producing a decision signal only when the amplitude of the reverse voltage/time integral signal exceeds a first prescribed value, the decision signal indicates that the power converting element is extinguished.

17 Claims, 9 Drawing Figures

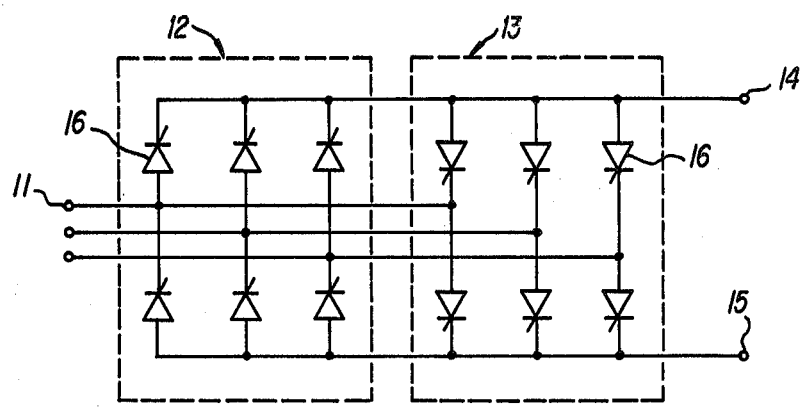
FIG. 1 PRIOR ART
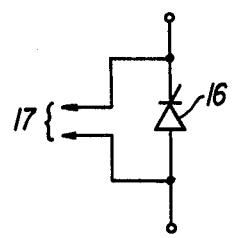
FIG. 2a
PRIOR ART
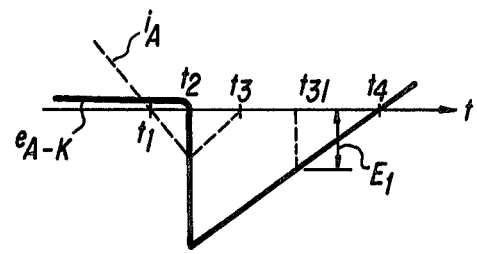
FIG. 2b
PRIOR ART
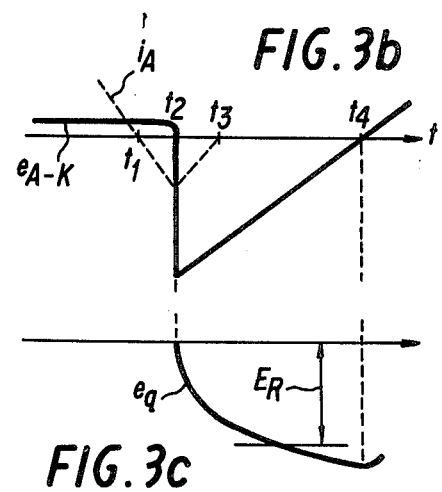
FIG. 3b
FIG. 3c

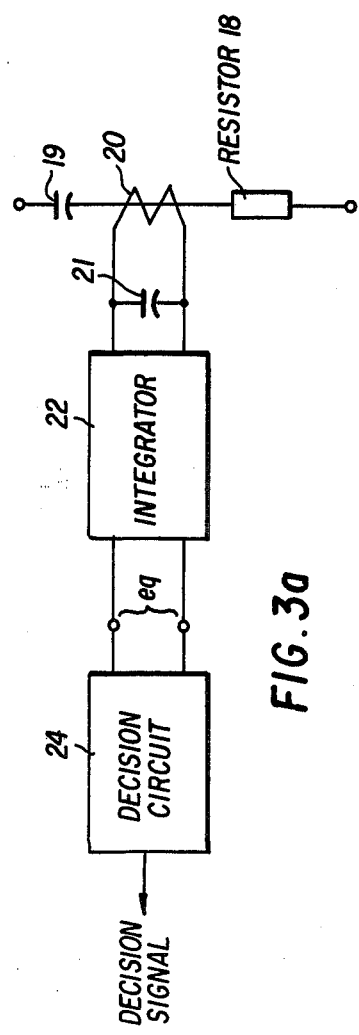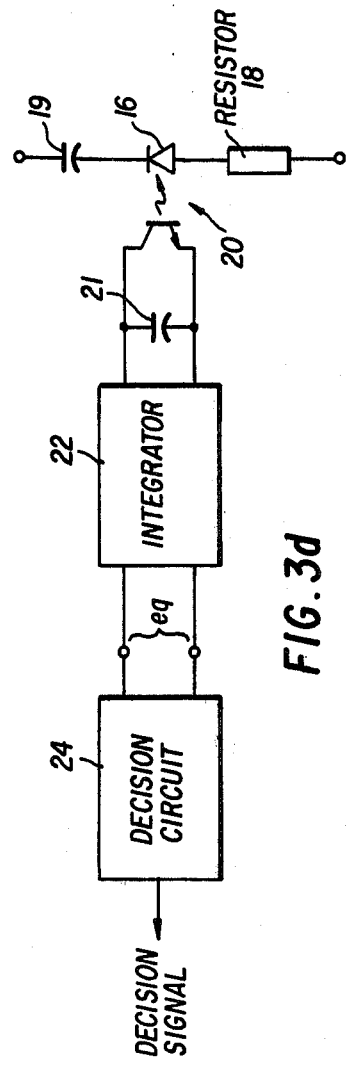

POWER CONVERTING DEVICE AND A PROTECTION DEVICE FOR THE SAME

BACKGROUND OF THE INVENTION

1. Field of the Invention

This invention relates to a novel power converting device and a novel protection device for the power converting device.

2. Description of the Prior Art

A variety of circuit systems are employed as the power converting devices which are connected with this invention. One example is shown in FIG. 1. In this Figure, 11 is an A.C. terminal, 12 is a forward rectifier, 13 is a reverse rectifier, 14 and 15 are D.C. terminals, and 16 indicates thyristors which act as the power converting elements. It is well known that a circuit composed as shown in FIG. 1 can convert A.C. power fed in from the A.C. terminal 11 into D.C. power by means of the forward rectifier 12; and that it can convert D.C. power fed in from the D.C. terminals 14 and 15 into A.C. power by means of the reverse rectifier 13. In such a case, when either the forward rectifier 12 or the reverse rectifier 13 is operating, it is necessary that the other rectifier be completely inoperative. If the rectifier is not totally inoperative, D.C. and A.C. short circuiting occurs. In order to prevent this, a technique has been employed to allow a prescribed time for the change-over between operating the forward rectifier 12 and the reverse rectifier 13. Another method is set forth in Japanese Patent Publication No. 45-40969. In order to gain a more rapidly responding control, it is necessary to make the above-mentioned operational change-over time as short as possible. For this, the method set forth in Japanese Patent Publication No. 45-40969 is excellent. In this method, for example, the voltages across thyristors 16 in the forward rectifier 12 are detected during operation and when sufficient reverse voltage to be applied to these thyristors 16 is detected, the thyristors 16 of the reverse rectifier 13 are fired.

The detection method which is set forth in Japanese Patent Publication No. 45-40969 will now be explained by means of FIG. 2. FIG. 2(a) shows an example of detecting the voltage of a thyristor 16, while FIG. 2(b) shows the waveforms of the thyristor voltage $e_{A-K}$ and current $i_A$ when the thyristor 16 is extinguished. As is shown in FIG. 2(b), the current $i_A$ decreases and becomes zero at time $t_1$, after which the reverse current reaches a peak at a time $t_2$. As FIG. 2(b) also shows, the thyristor voltage $e_{A-K}$ detected at the detection terminals 17 in FIG. 2(a) reveals that the reverse voltage begins to be applied to the thyristor 16 after time $t_2$, when the reverse current reaches a peak. At time $t_3$ the reverse current becomes zero, and at time $t_4$ the period of reverse voltage is completed. Since the thyristor 16 cannot be fully extinguished if a reverse voltage is not applied for a period of several tens of microseconds to several hundreds of microseconds, it can be judged whether or not the thyristor 16 has been fully extinguished, by keeping track of the reverse voltage of the thyristor 16 at the voltage detection terminals 17. Thus a high reliability, rapid-response power converting device can be offered, in which the other rectifier (either the forward rectifier 12 or the reverse rectifier 13) can be brought on line when it is ascertained that the thyristors 16 are completely extinguished.

However, although this method can easily be put into practice when the thyristors 16 have a low circuit voltage, if the circuit voltage reaches several thousand volts, then it becomes difficult to isolate the voltage detection terminals 17 and the circuit which judges the reverse voltage period (not illustrated). Consequently, a drawback of this method is that it is difficult to put into practice in high-voltage power converting devices.

Another problematic point in existing systems is that it is the magnitude of the reverse voltage applied to the thyristor 16 which is utilized to determine whether or not sufficient reverse voltage has been applied to the thyristor 16. Thus the method which has been adopted is to make the determination at time $t_{31}$ in FIG. 2(b), whether or not the reverse voltage $e_{A-K}$ is in accordance with a reference reverse voltage $E_1$, rather than to wait until the time $t_4$ to determine whether or not the reverse voltage has in fact been sufficient. In such a case the interval from time $t_2$ to time $t_{31}$ is usually set to be greater than the turn-off time required by the thyristor 16. The resulting defect has been that, due to the interval of reverse voltage application from time $t_{31}$ to time $t_4$ not being properly detected and evaluated, the protection circuit operates erroneously, unless a larger reverse voltage than that required to turn off the thyristor 16 is applied to the thyristor 16.

Generally, the reverse voltage applied to the thyristor in the power converting device changes dependently upon the changes of the voltage applied to the thyristor by the power source. In the power converting devices which are utilized in variable voltage-variable frequency power supplies, the voltage varies approximately in proportion to the frequency. In such devices, in the low-frequency operation region, the magnitude of the reverse voltage itself is small. For example, if the magnitude of the frequency is set to be 20% of that shown in FIG. 2(b), the magnitude of the reverse voltage applied to the thyristor 16 becomes 20% of the voltage $e_{A-K}$ shown in FIG. 2(b). In this case, the thyristor voltage $e_{A-K}$ even at time $t_2$, is smaller than the reference reverse voltage $E_1$ in FIG. 2(b). As a result, in the power converting devices which are utilized in variable voltage-variable frequency power supplies, erroneous operation of the protection device has occurred.

SUMMARY OF THE INVENTION

Accordingly, one object of this invention is to provide a novel power converting device, including a novel protection device thereof which can operate with a high-reliability.

Another object of this invention is to provide a novel power converting device, including a novel protection device thereof which has a high degree of detection accuracy and rapid response characteristics.

Still another object of this invention is to provide a novel power converting device, including a novel protection device thereof which is suitable to be used in a variable voltage-variable frequency power supply.

Yet still another object of this invention is to provide a novel power converting device, including a novel protection device thereof which can be used in high voltage operating region.

These and other objects of this invention can be achieved by providing a power converting device, including a protection device thereof wherein the integral value of the reverse voltage applied to the power converting elements is obtained and after which it is judged whether or not the power converting elements have been sufficiently extinguished.

According to the invention there is provided a power converting device including a plurality of power converting elements. The power converting device further includes a first circuit coupled to detect a reverse voltage applied to the power converting element, a second circuit coupled to the first circuit for receiving the detected reverse voltage and for integrating the detected reverse voltage to produce a reverse voltage/time integral signal, and a third circuit coupled to receive the reverse voltage/time integral signal for producing a decision signal only when the amplitude of the reverse voltage/time integral signal exceeds a first prescribed value, the decision signal indicates that the power converting elements are extinguished.

According to the invention there is further provided a protection device for a power converting device including a plurality of power converting elements. The protection device includes a first circuit adapted for connecting to the power converting element to detect a reverse voltage applied to the power converting element, a second circuit coupled to the first circuit for receiving the detected reverse voltage and for integrating the detected reverse voltage to produce a reverse voltage/time integral signal, and a third circuit coupled to receive the reverse voltage/time integral signal for producing a decision signal only when the amplitude of the reverse voltage/time integral signal exceeds a first prescribed value, the decision signal indicates that the power converting element is extinguished.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a circuit diagram showing one example of the construction of a power converting device of which this invention can be applied;

FIGS. 2(a) and 2(b) are drawings which clarify an existing protection device for a power converting device;

FIG. 3(a) is a circuit diagram showing one embodiment of this invention;

FIGS. 3(b) and 3(c) are operational waveform diagrams of the protection device shown in FIG. 3(a);

FIG. 3(d) is a circuit diagram of another embodiment of the invention; and

DESCRIPTION OF THE PREFERRED EMBODIMENTS

Figure 4A:
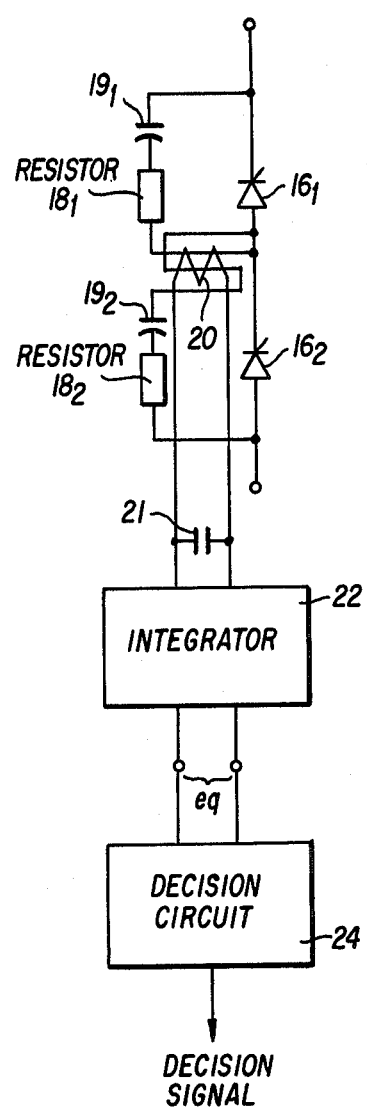
FIGS. 4(a) and 4(b) are circuit diagrams showing further embodiments of this invention.

Referring now to the drawings, wherein like reference numerals and letters designated identical or corresponding parts throughout the several views, and more particularly to FIG. 3(a) thereof, wherein one preferred embodiment of the invention is shown, reference numeral 16 is the thyristor forming either the forward rectifier 12 or the reverse rectifier 13 in the power converting device, for example, shown in FIG. 1. The resistor 18 and the capacitor 19 comprise a thyristor snubber circuit and the device further includes the current detector 20, which detects any current in the thyristor snubber circuit, a capacitor 21, an integrator 22, and a decision circuit 24. The output signal $e_q$ is generated from the integrator 22 (hereafter designated a reverse voltage/time integral signal). FIG. 3(b) is the same waveform as in FIG. 2(b), and shows the waveform of the voltage $e_{A-K}$ across the thyristor 16 and of the thyristor current $i_A$. FIG. 3(c) shows the reverse voltage/time integral signal $e_q$.

At time $t_1$ the current $i_A$ in the thyristor 16 momentarily becomes zero, after which the reverse current reaches a peak at time $t_2$. After time $t_2$ a reverse voltage begins to be applied to the thyristor 16 and the charging current of the reverse voltage begins to flow in the capacitor 19 of the thyristor snubber circuit. Accordingly, this current is detected by the current detector 20 and charges the capacitor 21. When this happens the voltage waveform of the capacitor 21 becomes roughly analogous to that of the voltage $e_{A-K}$ of thyristor 16. (That is, the voltage waveform of capacitor 21 lags behind that of the voltage $e_{A-K}$ of thyristor 16 by the time constant associated with the thyristor snubber circuit, but since the delay is only several microseconds to several tens of microseconds, little trouble is caused.) When the voltage signal of the capacitor 21 is integrated by the integrator 22 after time $t_2$, the reverse voltage/time integral signal $e_q$ is obtained, as in FIG. 3(c). This signal $e_q$ is the integral value of the reverse voltage which has been applied to the thyristor 16. Decision circuit 24 determines whether or not this reverse voltage/time integral signal $e_q$ has become larger than a prescribed value $E_R$ which is required for the thyristor 16 to turn off, and decides whether or not the thyristor 16 has been fully extinguished.

Here, a turn-off time $t_q$ required by the thyristor and the magnitude of the reverse voltage of the thyristor are closely related. For example, for a thyristor with a turn-off time of 100 microseconds when a reverse voltage of 150 volts is applied, if a reverse voltage of 50 volts is applied, the turn-off time $t_q$ will then roughly double to 200 microseconds. Hence, it is possible to determine whether or not the thyristor 16 has been completely extinguished, by measuring whether the reverse voltage/time integral signal $e_q$ has exceeded the prescribed value, remembering that this signal $e_q$ is the integral value of the reverse voltage applied to the thyristor 16.

On the basis of this invention, as has been explained above, it is possible to determine whether or not a thyristor 16 has been completely extinguished, even when the magnitude of the reverse voltage varies. Moreover, unlike existing systems, there need not be an unnecessary period of reverse voltage (the period from time $t_{31}$ to time $t_4$ in FIG. 2(b)). Consequently, the reverse voltage period (time $t_1$ to $t_4$) may be smaller than that is existing detection methods. Again, the protection device of this invention can be applied even when the circuit voltage of the thyristor 16 is high, since the protection device is isolated by the current detector 20. Hence a highly reliable power converting device and protection device thereof are possible. Moreover a power converting device and protection device thereof used in a variable voltage variable frequency power supply are possible.

Another embodiment of this invention is shown in FIG. 4a. This Figure shows an example of a circuit where the present invention has been embodied in a circuit in which two thyristors are connected in series. In this Figure, $16_1$ and $16_2$ are thyristors, $18_1$ and $18_2$ are resistors in respective thyristor snubber circuits, $19_1$ and $19_2$ are capacitors in the respective thyristor snubber cicuits, 20 is the current detector, 21 is the capacitor, 22 is the integrator, and 24 is the decision circuit. In this circuit diagram, siince the thyristor $16_1$ and the thyristor $16_2$ are connected in series, and since the currents in the respective thyristor snubber circuits can be simultaneously combined and detected by the current detector 20, the reverse voltage/time integral signal $e_q$, which has been integrated by the integrator 22 via the capacitor 21 in the same way as in FIG. 3a, is detected as the sum of the integral values of the reverse voltage of thyristors $16_1$ and $16_2$. Hence even when one of the thyristors $16_1$ and $16_2$ has been completely extinguished early on, and a sufficient reverse voltage has not been applied to the other thyristor, the fact that the reverse voltage/time integral signal $e_q$ does not attain the prescribed value is detected, and thus the power converting device can be protected.

Figure 4B:
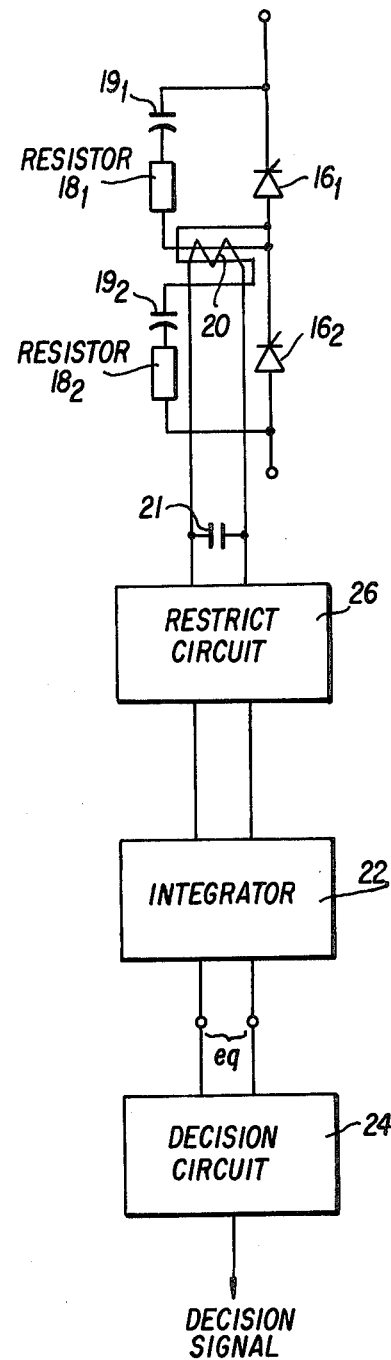

The integrator 22 in the embodiments of the present invention is not limited to a particular type, and it is clear that a variety of known integrating circuits can be utilized. Moreover, when the signal which corresponds to the reverse thyristor voltage and which is fed into the integrator 22, exceeds prescribed value, this input signal may also be restricted by means of a restrict circuit 26 as shown in FIG. 4b to below that prescribed value, and hence only a signal which corresponds to a reverse voltage of less than a prescribed value may be intergrated by the integrator 22. This is because there is little variation of turn-off time $t_q$ with magnitude of reverse voltage, when the reverse thyristor voltage is greater than several hundred volts.

As is shown in the embodiment illustrated in FIGS. 4a and 4b, the present invention may also protect a power converting device by detecting the integral value of the reverse voltages which are applied to two or more thyristors which have been connected in series, the specific number of thyristors and integrators not being restricted by the invention.

The method of detection via a current detector which is shown in FIGS. 3a, 3d, 4a and 4b is not the only possible means of detecting the reverse voltge applied to the thyristors. Another method is to use a detector in which Hall effect elements are utilized, or alternatively the reverse voltage/time integral signal $e_q$ may be obtained by feeding the reverse thyristor voltage directly into the integrator 22 via a photo-coupler (shown in FIG. 3d) and an insulator.

As has been explained above, use of this invention affords the following advantages. Since a reverse thyristor voltage is applied only up to the prescribed value, and since whether or not a thyristor has been completely extinguished is determined from the integral value of the reverse thyristor voltage, the accuracy of detection is higher than that of existing systems, and reliable judgement can be carried out even when the reverse voltage period is short. Consequently, even the power converting devices which are used in variable voltage-variable frequency power supplies, etc., can be reliably protected. Again, if this invention is applied to a power converting device which forms an inverter circuit such as is used as a D.C.—type thyristor motor, etc., then the outer form of such a thyristor motor can be made smaller than when existing protection systems are utilized. This is possible due to reliable detection, even for short reverse voltage periods, because the reactance of the motor may be large. Furthermore, since insulation problems can be solved even when there is a high circuit voltage, this invention can provide a power converting device, including the protection device thereof which operates with a high reliability and has a high degree of detection accuracy.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A power converting device, comprising:
   at least one power converting element;
   first means, coupled to said at least one power converting element, for detecting a reverse voltage;
   second means, coupled to said first means, for receiving said detected reverse voltage and for integrating said detected reverse voltage to produce a reverse voltage/time integral signal; and
   third means coupled to said second means for receiving said reverse voltage/time integral signal and for producing a decision signal only when the amplitude of said reverse voltage/time integral signal exceeds a first prescribed value, said decision signal indicating that said at least one power converting element is extinguished.

2. The power converting device according to claim 1, further comprising:
   at least two anti-parallel coupled rectifiers;
   each of said rectifiers having a plurality of said power converting elements.

3. The power converting device according to claim 1 or 2, wherein:
   said at least one power converting element comprises a thyristor.

4. The power converting device according to claim 3, further comprising:
   plural power converting thyristors,
   a plurality of snubber circuits, each of said snubber circuits including a series connected circuit of a first capacitor and a resistor and being coupled in parallel with respective of said thyristors; and
   said first means including,
   fourth means for detecting a current flowing through each said snubber circuit, and
   fifth means coupled to said fourth means for receiving said detected current and for integrating said detected current to produce said integrated current signal as said reverse voltage.

5. The power converting device according to claim 4, comprising:
   a series circuit of a plurality of said thyristors;
   said fourth means connected to a series circuit of a plurality of said snubber circuits corresponding to said series connected thyristors for detecting a total current flowing through each of said series connected snubber circuits; and
   said fifth means coupled to receive said total current as said detected current.

6. The power converting device according to claim 4, wherein:
   said fourth means includes a current detector coupled to said snubber circuit for detecting said current flowing through said snubber circuit; and
   said fifth means includes a second capacitor coupled in parallel with said current detector, whereby said detected current detected by said current detector charges said second capacitor and a charged voltage across said second capacitor is produced as said reverse voltage.

7. The power converting device according to claim 5, wherein:
said fourth means includes a current detector for detecting said total current flowing through each of said series connected snubber circuits; and
said fifth means includes a second capacitor coupled in parallel with said current detector, wherein said detected total current by said current detector charges said second capacitor and a charged voltage across said second capacitor is produced as said reverse voltage.

8. The power converting device according to claim 3, wherein:
said first means includes a photo coupler.

9. The power converting device according to claim 3, wherein:
said first means includes restricting means coupled to receive said detected reverse voltage applied to said thyristor for producing a restricted signal, said restricted signal being restricted to a second prescribed value when said detected reverse voltage exceeds said second prescribed value and being equal to said detected signal when said detected reverse voltage is not more than said second prescribed value;
said first means produces said restricted signal as an output signal thereof; and
said second means is connected to receive said restricted signal as said detected reverse voltage.

10. The power converting device according to claim 3, comprising:
plural power converting elements arranged as three phase thyristor bridge rectifiers.

11. A protection device for a power converting device including at least one power converting element, comprising:
first means coupled to said at least one power converting element for detecting a reverse voltage applied thereto;
second means coupled to said first means for receiving said detected reverse voltage and for integrating said detected reverse voltage to produce a reverse voltage/time integral signal; and
third means coupled to said second means for receiving said reverse voltage/time integral signal and for producing a decision signal only when the amplitude of said reverse voltage/time integral signal exceeds a first prescribed value, said decision signal indicating that said power converting element is extinguished.

12. The protection device according to claim 11, wherein said power converting device is formed of plural power converting thyristors, comprising:
a plurality of snubber circuits, each including a series connected circuit of a first capacitor and a resistor coupled in parallel with a respective of said thyristors; and
said first means including,
fourth means for detecting a current flowing through said snubber circuits, and
fifth means coupled to said fourth means for receiving said detected current and for integrating said detected current to produce said integrated current signal as said reverse voltage.

13. The protection device according to claim 12, wherein said power converting device includes a series circuit of a plurality of said thyristors comprising:
plural series connected snubber circuits provided for respective series connected thyristors;
said fourth means coupled to a series circuit of a plurality of said snubber circuits corresponding to said series connected thyristors for detecting a total current flowing through each of said series connected snubber circuits; and
said fifth means coupled to said fourth means for receiving said total current as said detected current.

14. The protection device according to claim 12, wherein:
said fourth means includes a current detector coupling said snubber circuits for detecting said current flowing through said snubber circuits; and
said fifth means includes a second capacitor coupled in parallel with said current detector, whereby said detected current by said current detector charges said second capacitor and a charged voltage across said second capacitor is produced as said reverse voltage.

15. The protection device according to claim 13, wherein:
said fourth means includes a current detector coupled to said series connected snubber circuits for detecting said total current flowing through each of said series connected snubber circuits; and
said fifth means includes a second capacitor coupled in parallel with said current detector, wherein said detected total current by said current detector charges said second capacitor and a charged voltage across said capacitor is produced as said reverse voltage.

16. The protection device according to claim 11, wherein:
said first means includes a photo coupler.

17. The protection device according to claim 11, wherein said power converting element includes a thyristor, comprising;
said first means including,
restricting means coupled to said thyristor for receiving said detected reverse voltage applied to said thyristor and for producing a restricted signal, said restricted signal being restricted to a second prescribed value when said detected reverse voltage exceeds said second prescribed value and being equal to said detected signal when said detected reverse voltage is not more than said second prescribed value;
said first means producing said restricted signal as an output signal thereof; and
said second means connected to receive said restricted signal as said detected reverse voltage.

* * * * *